United States Patent [19]
Perez-Wilson

[11] Patent Number: 5,392,584
[45] Date of Patent: Feb. 28, 1995

[54] METHOD AND APPARATUS FOR PRODUCING ROOF TILE

[76] Inventor: George A. Perez-Wilson, 12622 N. 80th Pl., Scottsdale, Ariz. 85260

[21] Appl. No.: 59,461

[22] Filed: May 11, 1993

[51] Int. Cl.⁶ .................. E04C 2/20; E04D 15/02
[52] U.S. Cl. .................. 52/747; 52/745.05; 264/257
[58] Field of Search .......... 52/555, 747, 745.05, 52/741.1; 264/257

[56] References Cited

U.S. PATENT DOCUMENTS

| | | | |
|---|---|---|---|
| 3,329,546 | 7/1967 | Scheinart | 264/257 |
| 3,485,002 | 12/1969 | Baker | 52/555 |
| 4,498,267 | 2/1985 | Beck | 52/555 |
| 4,986,948 | 1/1991 | Komiya et al. | 264/257 |

Primary Examiner—James L. Ridgill, Jr.
Attorney, Agent, or Firm—Tod R. Nissle

[57] ABSTRACT

A method and apparatus are utilized to produce panels which simulate overlapping red clay roof tile. The panels are fire resistant, impact resistant, opaque, lightweight, and have sufficient strength to support fully the weight of an individual walking on the tile.

2 Claims, 2 Drawing Sheets

METHOD AND APPARATUS FOR PRODUCING ROOF TILE

This invention relates to roof tile.

More particularly, the invention relates to a method and apparatus for producing roof tile which is fire resistant, impact resistant, opaque, lightweight, and has sufficient strength to support the weight of an individual walking on the tile.

Red roof tile are well known, particularly in the southwestern portion of the United States. Such tile are arcuate and are placed on a roof in rows which each extend from the peak of a roof to the eave or lower edge of the roof. Each row consists of a series of overlapping tile. While such roof tile are aesthetically pleasing and resistant to the elements, the tile have several disadvantages. The tile are manufactured from a red clay mixture and, consequently, are brittle and easy to damage, and are heavy. The weight of the tile incurs significant shipping and storage costs. Attempting to walk over such tile is therefore dangerous because the tile are easily broken. Further, the tile are slippery, which makes it difficult to maintain ones' footing when traversing the tile.

Accordingly, it would be highly desirable to provide an improved roof tile which would maintain the aesthetic qualities of conventional clay roof tile while significantly reducing the weight, increasing the strength, and simplifying installation of the tile.

Therefore, it is the principal object of the invention to provide an improved roof tile panel that simulates conventional tile rows which extend in a direction from the peak to the eave of the roof in overlapping relationship.

Another object of the invention is to provide improved roof tile panel which can readily support the weight of an individual, is lightweight, fire resistant, and impact resistant.

A further object of the invention is to provide an improved method for manufacturing roof tile which significantly reduces the cost of manufacturing and installing the tile in comparison to conventional red clay roof tiles.

These and other, further and more specific objects and advantages of the invention will be apparent to those skilled in the art from the following detailed description thereof, taken in conjunction with the drawings, in which.

Briefly, in accordance with my invention, I provide an improved method for manufacturing a panel simulating a plurality of overlapping roof tile. The method includes the steps of manufacturing a mold including a plurality of spaced apart generally parallel rows each replicating the appearance of a plurality of overlapping stepped arcuate roof tile; preparing a viscous polymer mixture including from 30% to 75% by weight synthetic polymer resin, including from 15% to 50% by weight filler, including from 0.5% to 5.0% by weight catalyst to harden said resin, and including from 1% to 10% by weight pigment composition to color the polymer mixture; conforming a pliable sheet of fiberglass to the parallel rows; applying the viscous polymer mixture to the mold to cover the fiberglass sheet and conform to the parallel row to form a layer of the mixture which has generally uniform thickness, covers the fiberglass sheet, conforms to the parallel rows, and defines a series of generally parallel rows each replicating the appearance of a plurality of overlapping stepped arcuate roof tile; hardening the layer; and, removing the hardened layer from the mold.

In another embodiment of my invention, I provide an improved method for installing roofing on the roof of a building structure. The improved method includes the step of manufacturing a panel simulating a plurality of overlapping roof tile. The method of manufacturing the panel comprises the steps of manufacturing a mold including a plurality of upstanding spaced apart generally parallel rows each replicating the appearance of a plurality of overlapping stepped arcuate roof tile; preparing a viscous polymer mixture including from 30% to 75% by weight synthetic polymer resin, from 15% to 50% by weight aluminum trihydrate filler, from 0.5% to 5.0% by weight hydrogen peroxide catalyst to harden said resin, from 1% to 10% by weight pigment-resin composition to color the polymer mixture; conforming a pliable sheet of fiberglass to the parallel rows; applying the viscous polymer mixture to the mold to cover the fiberglass sheet and conform to the parallel rows to form a first panel layer of the mixture which has generally uniform thickness, covers the fiberglass sheet, conforms to the parallel rows, and defines a series of hollow arcuate generally parallel rows each replicating the appearance of a plurality of overlapping stepped arcuate roof tile; hardening the first panel layer; and, removing said hardened first panel layer from the mold. The mold is used to produce a second panel layer having a shape and dimension equivalent to the first panel layer. The first panel layer is positioned on the roof of the building structure. The second panel layer is positioned on the roof of the building structure with the arcuate hollow rows of the second panel overlapping a portion of the arcuate hollow rows of the first panel layer.

Figure 1:
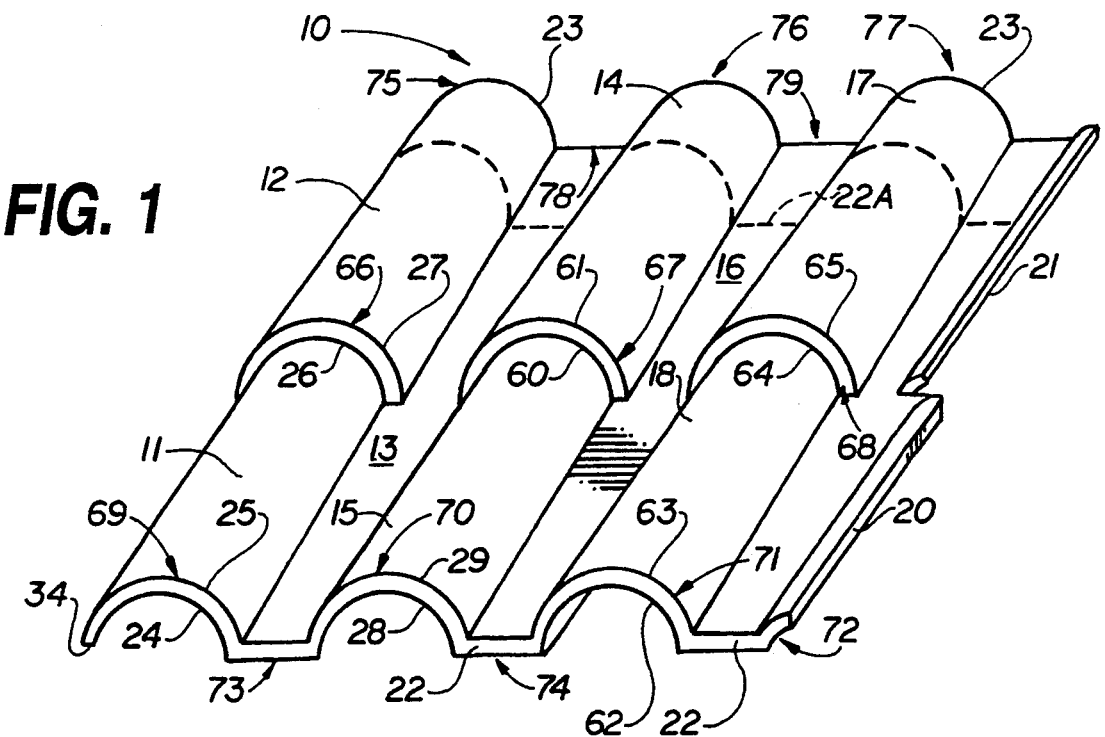
FIG. 1 is a perspective view of a roof tile section manufactured in accordance with the method of the invention.

Turning now to the drawings, which depict the presently preferred embodiments of the invention for the purpose of illustrating the practice thereof and not by way of limitation of the scope of the invention, and in which like reference characters refer to corresponding elements throughout the several views, FIG. 1 illustrates a roof tile panel 10 produced in accordance with the principles of the invention. Panel 10 includes continuous leading edge 22, continuous trailing edge 23, and flat panel portions 13, 16, and 19. Edge 22 includes radius 72; semi-circular ends 69, 70, 71; and the linear portions 73 and 74 interconnecting end pairs 69–70 and 70–71, respectively. Edge 23 includes the semi-circular ends 75 to 77; the linear portions 78 and 79 interconnecting end pairs 75–76 and 76–77, respectively; and, a radius on section 21. Hollow sections 11, 15, 18, 12, 14, 17 each taper rearwardly toward trailing edge 23. Consequently, each section 11, 15, 18, 12, 14, 17 comprises one-half of a hollow truncated conical section. A cross section of each section 11, 15, 18, 12, 14, 17 produces a semi-circular edge. The inner radius of the semi-circular end 69 equals the inner radius 26 of the semi-circular end or "step" 66 of section 12. The outer radius 25 of the semi-circular end 69 equals the outer radius 27 of the semicircular end or "step" 66 of section 12. The outer radii 29 and 63 of ends 70 and 71 each equal the radius 25 of end 69. The inner radii 28 and 62 of ends 70 and 71 each equal in the inner radii 24 of end 69. The outer radii 61 and 65 of ends 67 and 68 each equal the outer radii 27 of end 66. The inner radii 60 and 64 of sections 14 and 17 each equal the inner radii 26 of end or step 66. Each pair of sections 11–12, 14–15, and 17–18 replicate or simulate the appearance of an overlapping pair of conventional red clay roof tile in a row of the tile. If desired, each panel 10 can simulate rows of roof tile including three or more overlapping tile. In FIG. 1, each row of tile only simulates a pair of overlapping tile; i.e., sections 11 and 12 in the left most row of tile in FIG. 1 simulate a pair of overlapping tile.

Figure 3:
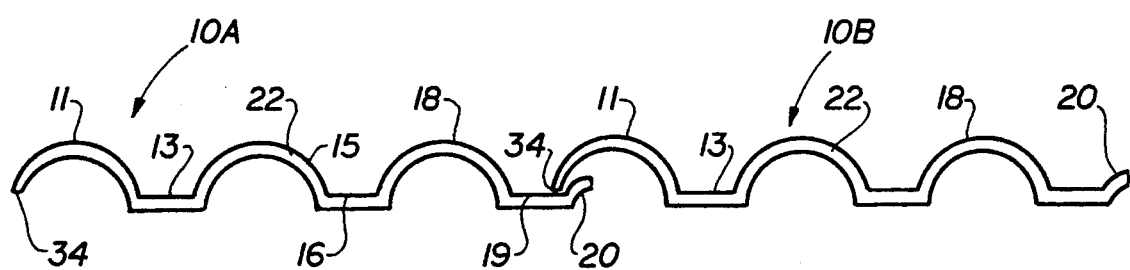

Elongate radius sections 20 and 21 permit a side-by-side pair of panels 10 to "interlock" or overlap in the fashion illustrated in FIG. 3. In FIG. 3, edge 34 of a panel 10B overlaps radius section 20 of panel 10A. Panels 10A, 10B are each identical to panel 10 in FIG. 1. Further, when panels 10 are placed one on top of or above the other, the leading edge of the panel with the higher elevation overlaps sections 12, 14, 17 and is positioned along the dashed line 22A in FIG. 1. Such overlapping of panels 10 is similar to the overlapping of conventional arcuate red clay roof tiles commonly found on buildings in desert areas of the American Southwest.

Figure 2:
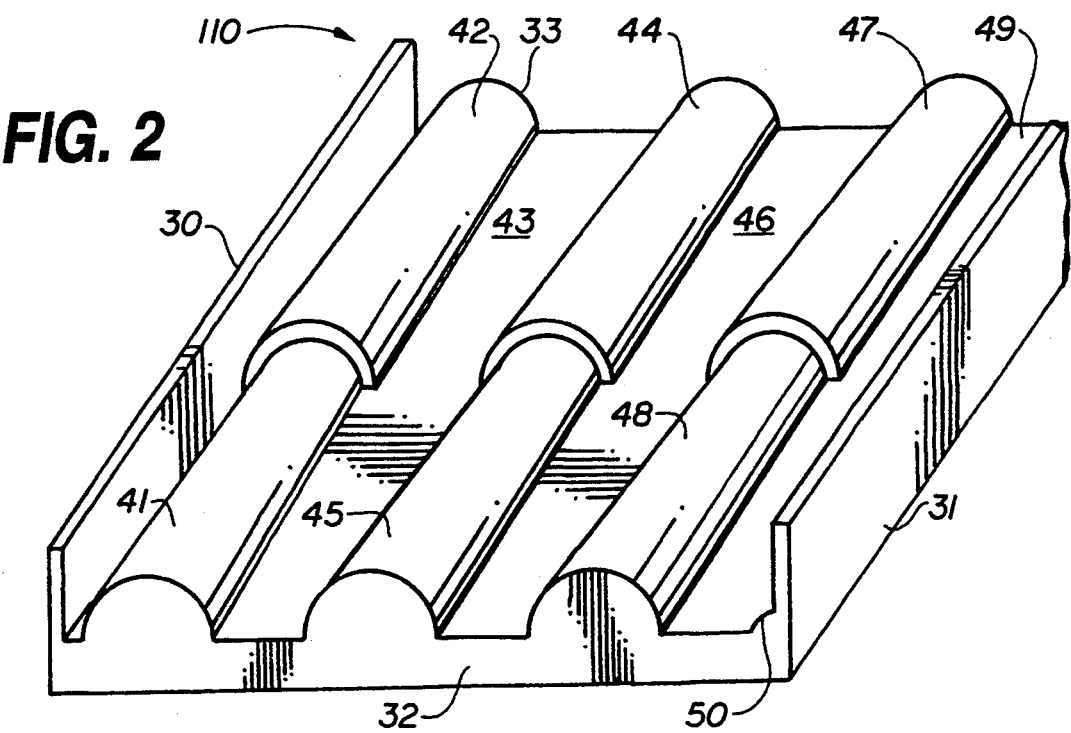
FIG. 2 is a perspective view of a mold utilized to produce the roof tile section of FIG. 1; and, FIG. 3 is a side elevation view of a pair of tile sections positioned in overlapping relationship desired when the tile section are affixed to the roof of a building structure.

The panel of FIG. 1 is fabricated with the assistance of the mold of FIG. 2. First, a sheet of pliable porous permeable woven fiberglass mesh is placed in mold 11 over and adjacent the flat panel surfaces 43, 46, 49; over and adjacent the truncated semi-conical portions 41, 42, 44, 45, 47, and 48; and over and adjacent the arcuate radius surfaces 50. The mesh is presently about one-sixteenth of an inch thick and must be at least 3/64 of an inch thick to provide a "skeleton" which is sufficient to produce a strong tile panel which will not warp or bend. A viscous resin mixture or paste is then brushed over the mesh. This resin paste wets the fiberglass mesh, making it pliable and adding weight and body to the mesh so it can be formed around and closely conformed to surfaces 43, 46, 49 and portions 41, 42, 44, 45, 47 of mold 110. The mesh permits the resin paste to penetrate the mesh and contact the mold surfaces. The viscosity of the resin mixture is similar to that of molasses and is great enough to prevent resin which is brushed over portions 41, 42, 44, 45, 47, and 48 from, before the resin hardens, flowing downwardly under the force of gravity toward flat surface 43, 46, and 49. The thickness of the layer of resin mixture brushed onto mold 11 is in the range of three-sixteenths of an inch to one quarter of an inch. The resin mixture is permitted to harden by exposure to ambient air and temperature. If desired, the mixture can be exposed to an ultraviolet light source to speed the hardening process. When ultraviolet light is utilized, the resin may set up in three minutes or less. After the resin mixture hardens, the panel 10 is peeled off of mold 110 in the form illustrated in FIG. 1.

The viscous resin mixture which is applied to mold 110 is produced by mixing together a synthetic polymer resin, a filler, a catalyst to harden the resin, and a pigment composition to color the resin mixture. The resulting paste mixture consists of from 30% to 75% by weight of the synthetic polymer resin, from 15% to 50% by weight filler, from 0.5% to 5.0% by weight catalyst, and from 1% to 10% by weight pigment composition. While many synthetic polymer resins are known in the art, examples of resins suitable in the practice of the invention are the Koppers polyester resins 1088-10 and 1088-10SG produced by the Koppers Company, Inc. of Pittsburgh, Pa. 15219. These resins are promoted, low viscosity, resilient resins which have the characteristics of reduced shrinkage, and low exotherm. The presently preferred filler is aluminum trihydrate because the trihydrate releases water when heated and therefore deters fire, enabling panels 10 to pass the three tests of fire resistance for Class A roof coverings which are specified in ASTM E–108. The presently preferred catalyst is hydrogen peroxide, while the pigment composition is polyester gel coat resin. One type of polyester gel coat is the "A Series" Isophthalic polyester base gel coat sold by HK Research Corporation of 908 Lenoir Road, Hickory, N.C. 28603. This gel coat is based on a premium isophthalic resin system that meets or exceeds most plumbing wear and general purpose applications. Another type of polyester gel coat is the "G Series", also sold by HK Research Corporation. This gel coat is based on an NPG isophthalic resin system and is formulated to provide the ultimate in blister and weather resistance. Such gel coats ordinarily are not, however, blended with a resin mixture before the resin is applied to a fiberglass mesh. The gel coats instead serve as a coating, as their name implies.

Once a plurality of panels 10 are manufactured, the panels are affixed to the roof of a building structure in conventional fashion. For example, a first panel 10 is positioned over the lowermost elevation of the roof adjacent the eave. The panel is then nailed or otherwise affixed to the roof. The panel 10 is usually nailed along the trailing edge 23 which is subsequently overlapped and covered by the leading edge 22 and portion of another panel 10. A second panel 10 is then positioned at a higher elevation on the roof than the first panel such that the leading edge 22 overlaps sections 12, 14, 17 of the first panel along dashed line 22A in FIG. 1. The second panel is then affixed to the roof. A third panel 10 is the positioned at the same elevation on the roof a the first panel but to one side of the first panel such that the edge 34 of the third panel overlaps portion 20 of the first panel in the manner illustrated in FIG. 3. The third panel is then affixed to the roof. The foregoing procedure is repeated until the roof is covered by overlapping panels 10. A particular advantage of the panels of the invention is that it significantly reduces the amount of material required to cover a roof. The area covered by panel 10, which simulates the appearance four conventional clay roof tiles, would ordinarily require eight conventional clay roof tiles to be fully covered.

Having described my invention in such terms as to enable those skilled in the art to understand and practice it, and having identified the presently preferred embodiments thereof, I claim:

1. A method for manufacturing a panel simulating a plurality of overlapping roof tile, comprising the steps of
    (a) manufacturing a mold including a plurality of spaced apart generally parallel rows each replicating the appearance of a plurality of overlapping stepped arcuate roof tile;
    (b) preparing a viscous polymer mixture including
        (i) from 30% to 75% by weight synthetic polymer resin,
        (ii) from 15% to 50% by weight filler,
        (iii) from 0.5% to 5.0% by weight catalyst to harden said resin, (iv) from 1% to 10% by weight pigment composition to color said polymer mixture;

(c) conforming a pliable sheet of fiberglass to said parallel rows;

(d) applying said viscous polymer mixture to said mold to cover said fiberglass sheet and conform to said parallel row to form a layer of said mixture which has generally uniform thickness, covers said fiberglass sheet, conforms to said parallel rows, and defines a series of generally parallel rows each replicating the appearance of a plurality of overlapping stepped arcuate roof tile;

(e) hardening said layer;

(f) removing said hardened layer from said mold.

2. A method for installing roofing on the roof of a building structure, including the steps of (a) manufacturing a panel simulating a plurality of overlapping roof tile, comprising the steps of (i) manufacturing a mold including a plurality of upstanding spaced apart generally parallel rows each replicating the appearance of a plurality of overlapping stepped arcuate roof tile, (ii) preparing a viscous polymer mixture including from 30% to 75% by weight synthetic polymer resin, from 15% to 50% by weight aluminum trihydrate filler, from 0.5% to 5.0% by weight hydrogen peroxide catalyst to harden said resin, from 1% to 10% by weight pigment-resin composition to color said polymer mixture;

(iii) conforming a pliable sheet of fiberglass to said parallel rows;

(iv) applying said viscous polymer mixture to said mold to cover said fiberglass sheet and conform to said parallel row to form a first panel layer of said mixture which has generally uniform thickness, covers said fiberglass sheet, conforms to said parallel rows, and defines a series of hollow arcuate generally parallel rows each replicating the appearance of a plurality of overlapping stepped arcuate roof tile;

(v) hardening said first panel layer;

(vi) removing-said hardened first panel layer from said mold;

(b) using the mold and process of step (a) to produce a second panel layer having a shape and dimension equivalent to said first panel layer;

(c) positioning said first panel layer on the roof of the building structure; and, (d) positioning said second panel layer on the roof of the building with said arcuate hollow rows of said second panel overlapping a portion of said arcuate hollow rows of said first panel layer.

* * * * *